United States Patent [19]
Malcolm

[11] Patent Number: 5,251,291
[45] Date of Patent: Oct. 5, 1993

[54] METHOD OF SELECTIVELY TRANSFERRING VIDEO DISPLAYED INFORMATION

[75] Inventor: Jerry W. Malcolm, Austin, Tex.

[73] Assignee: International Business Machines Corporation, Armonk, N.Y.

[21] Appl. No.: 923,008

[22] Filed: Jul. 30, 1992

Related U.S. Application Data

[63] Continuation of Ser. No. 421,479, Oct. 13, 1989, abandoned.

[51] Int. Cl.$^5$ ............................................. G06F 15/62
[52] U.S. Cl. .................................... 395/146; 395/155; 395/161
[58] Field of Search .................. 395/145-149, 395/157, 158, 161

[56] References Cited

U.S. PATENT DOCUMENTS

| | | | |
|---|---|---|---|
| 4,434,464 | 2/1984 | Suzuki et al. | 364/200 |
| 4,628,479 | 12/1986 | Borg et al. | 364/900 |
| 4,646,250 | 2/1987 | Childress | 395/148 |
| 4,890,098 | 12/1989 | Dawes et al. | 340/721 |

FOREIGN PATENT DOCUMENTS

| | | |
|---|---|---|
| 0109581 | 5/1984 | European Pat. Off. . |
| 0178499 | 4/1986 | European Pat. Off. . |
| 0312480 | 4/1989 | European Pat. Off. . |

OTHER PUBLICATIONS

Microsoft Windows User's Guide/Microsoft Windows Write User's Guide, Version 2.0, Microsoft Corp. 1987, Windows User's Guide: pp. 131-134, Windows Write User's Guide: pp. 59-65 and 69-71.

*Primary Examiner*—Heather R. Herndon
*Attorney, Agent, or Firm*—Casimer K. Salys

[57] ABSTRACT

A method for moving data between sessions on a workstation having a video display. A source session having data in protected and unprotected fields is copied to storage through a clipboard media. Pasting of data from the clipboard into unprotected fields of a destination session is accomplished selectively. Pasting is selectively concluded based upon a comparison of source protected fields with corresponding destination protected fields, where the workstation operator is notified of mismatches and responds accordingly.

15 Claims, 1 Drawing Sheet

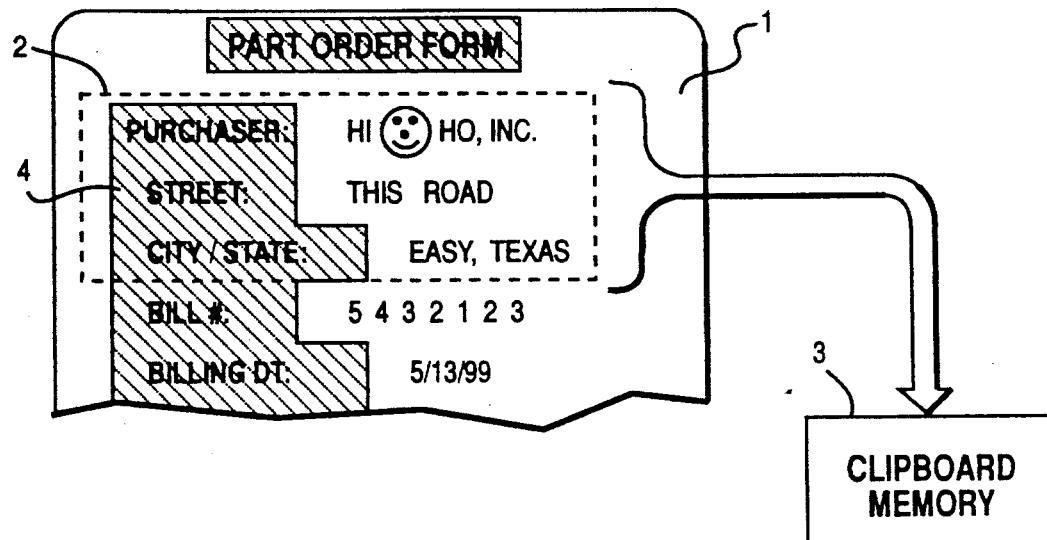
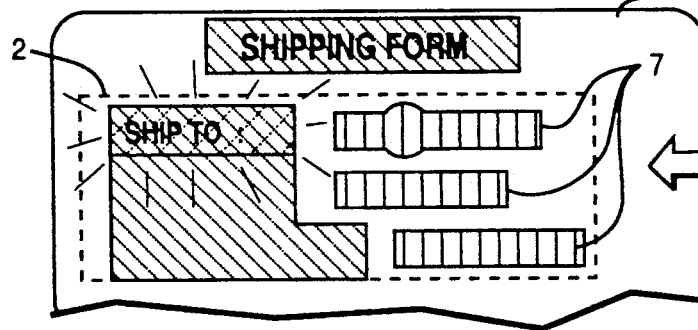
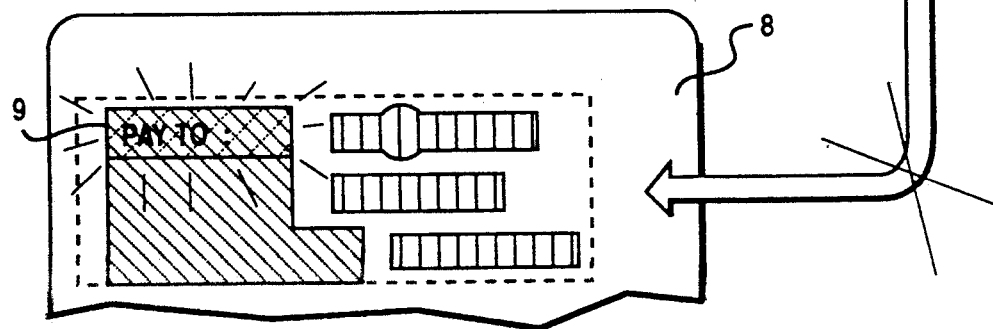

METHOD OF SELECTIVELY TRANSFERRING VIDEO DISPLAYED INFORMATION

This is a continuation of application Ser. No. 07/421,479 filed Oct. 13, 1989, now abandoned.

BACKGROUND OF THE INVENTION

This invention relates to a method for selectively transferring information among different operating session being executed by a workstation having a video display. In a preferred form, the invention is practiced in the transfer of information characterized in that the source and destination information includes a composite of protected and unprotected fields.

Contemporary workstations use high speed computers to drive video displays in response to controls provided by human users through input/output devices such as a keyboard, a mouse or a pointer. Often the entry of raw information into the information processing system must be repeated to adjust for differences in format or structure between programs or sessions running on the workstation. In the context of business applications, customer information or the like entered into one session or program is frequently re-entered for different sessions or programs. Many workstations fail to provide a media and data structure for directly linking information between programs or sessions.

A partial solution to the movement of information from one program or session to another is typified by the clipboard class of utility programs available in many workstations. In general, the clipboard program permits the human operator to identify desired information in a video display, by circumscribing the region with a rectangular perimeter line controlled by a mouse or keyboard, and then storing the information within the defined region for future use. The information stored by the clipboard program can thereafter be selectively pasted into a destination screen upon command, once or a multiplicity of times. Though the movement of information using a clipboard concept has significantly reduced the burden of full data re-entry, the clipboard creates ambiguous situations when used with programs having video displayed patterns including both protected and unprotected fields.

Protected fields are those regions of a video displayed pattern which may not be changed by the user in the course of interacting with the program operating on the workstation. Typical examples of protected fields are prompts such as "name" and "street address", which appear in record generation programs. The unprotected fields in such text applications are the spaces which accept data from the user entered by keyboard or other input device. As was noted earlier, the ideal information processing system would upon receipt of data into an unprotected field immediately replicate or link that data to corresponding other unprotected fields among various related programs or sessions. Unfortunately, such links or threads are not commonly available and are being further complicated with the trend toward information composed of graphic characters such as icons or bit mapped pattern representations.

The use of a clipboard utility to copy selected patterns from a source screen and thereafter selectively transfer such patterns to a destination screen by pasting clearly has appeal given that the process encompasses the movement of both text and graphic representations. However, when used with video display programs or sessions having a mix of protected and unprotected fields, the clipboard may mislead the user, and as a consequence introduce pervasive errors in the data being transferred. The present invention recognizes the potential for such errors and therefor provides a method for using a clipboard utility to transfer information between programs and sessions without loosing control of the data characteristics and with a full awareness of the effects that a pasting operation will have upon the information.

SUMMARY OF THE INVENTION

According to one practice of the invention, the operator of an information processing system selects from a video display source the information to be transferred. Thereafter, the operator selectively defines the destination for pasting the information. Before pasting is actually executed, the source and destination information is compared for mismatches, with the reconciliation as to pasting controlled by the workstation operator. In a more particularized form, the method of the invention involves the creation of a clipboard copy of source information using operator defined patterns which encompass source space having protected and unprotected fields. Pasting of the clipboard patterns onto destination space having protected and unprotected fields follows a comparison of protected field information for coincidence. If coincidence, or other specified matching condition occurs, the unprotected fields are transferred without operator intervention. Otherwise, the operator is notified of a mismatch to insure that the information in the unprotected fields is correctly related to the characteristics in the associated protected fields of the destination space.

The use of the clipboard concept is particularly useful in transferring information within an emulator workstation environment. The information transferred can include text characters as well as graphics and in the course of such transfer can be further modified or deleted.

These and other features of the invention will be more clearly understood and appreciated upon considering the ensuing detailed description.

BRIEF DESCRIPTION OF THE DRAWING

The drawing schematically illustrates the creation of a clipboard using source space information and its subsequent pasting in one or more destination space sessions.

DESCRIPTION OF THE PREFERRED EMBODIMENT

The direct use of a clipboard function in the transfer of information between programs or sessions, for example in a multiprocessor workstation session, will introduce errors and confusion if performed with both source and destination information having protected and unprotected fields. For example, the operator will prefer to carry protected field information from the source to the clipboard as a means of temporally identifying the information and correlating the protected and unprotected information during the pasting operation. Furthermore, such workstation operator will recognize the existence and function of protected fields, and would therefore not expect to alter the destination space protected fields during the pasting operation. In this context, the operator would benefit from a method which allowed copying of information to clipboard and subsequent rapid pasting of clipboard information with minimum operator intervention, preferably such intervention arising only when the pasting operation could introduce an error.

In general, the present invention contemplates that the protected fields from the source be copied onto the clipboard so as to retain their protected field identity. During pasting, if the source protected fields and the destination protected fields match according to defined parameters, for example identical by pixel, color or character class, the pasting operation would proceed immediately without operator intervention. On the other hand, a mismatch would involve further analysis and potential notification of the operator to elicit whether supervisory intervention is needed in executing the pasting of the associated clipboard unprotected fields.

It is possible that the fields transferred to the clipboard may not align with the fields in the destination space, or that the operator desires and misperceives that the whole of the clipboard information, protected and unprotected, will be replicated in the destination space. Again, according to the present invention, if the protected fields match according to the defined criteria, the operator would not be burdened with a decision and associated operating delay.

A preferred practice of the invention is schematically depicted in the drawing. According to the practice, a user situated before an information processing system, such as a workstation with a resident computer or a terminal connected to a network having a host computer, selects from a source in a first program session screen 1 text, graphics or a combination thereof having the information or data which is to be replicated in whole or in part in destination screens or sessions. To begin, the user manipulates a keyboard, mouse or other physical pointing mechanism, to establish a perimeter, such as the rectangular perimeter defined by line 2, to select from the whole of the space of the source screen 1 the selected information to be transferred and stored in the system memory as a clipboard. Though it is possible to erase the source screen information within the perimeter line 2 as an element of transferring it to clipboard memory 3, the more likely practice will involve a mere copying of the information into clipboard memory.

Clipboard memory 3 may be a part of the frame buffer memory, a part of the system memory, dedicated system memory, or even nonvolatile memory such as disk storage. The form of the information transferred is also not constrained to alphanumeric characters, but may include a full bit map reproduction with information regarding the protection status of each character or pixel. As to the later facet of the information being transferred to clipboard memory 3, note that perimeter 2 encloses a mix of protected and unprotected fields, where the protected fields are shown by right sloping section lines encompassing words such as "PURCHASER". Therefore, the program which generated the illustrated source screen was structured to prevent user modification of the prompt information within protected regions 4 while operating in the source session. The clipboard memory 3 stores the complete copy of the source screen information within perimeter line 2, including the protected field status.

In the context of the defined information processing system, the operator thereafter desires to transfer selected information stored in clipboard memory 3 to destination sessions or programs with a minimum amount of intervention and delay. Elaborating somewhat, though rapid transfers of information from clipboard memory 3 are sought, error avoidance remains a preeminent consideration. To attain this goal, the present invention requires that the information within perimeter line 2, copied to clipboard memory 3, be evaluated by the workstation processor before being pasted into a destination session screen such as 6. Therefore, during or after manipulation of clipboard information by mouse or the like on the destination space screen, the clipboard information is logically compared to the information in the destination space region within perimeter line 2. In the schematically depicted example, the protected fields within perimeter 2 of the destination session, the prompt field having the words "SHIP TO", is compared to the protected field information conveyed by the clipboard memory. In this case, "SHIP TO" would not be equivalent to the three prompt lines worded "PURCHASER", "STREET" and "CITY/STATE" on an alphanumeric basis of comparison. Once the mismatch is identified by the system, the operator is notified by an audible signal, a visible color changes, a visible background inversion, a pulsing video or other interactive response.

The operator then chooses whether to paste the unprotected information from the clipboard memory, generally at 7, into the unprotected field of destination session 6 notwithstanding the inconsistency of the protected field information, such as in the depicted example where the "PURCHASER", "STREET", and "CITY/STATE" fields and "SHIP TO" fields do not match. Consequently, the method of the present invention provides a means for using a clipboard to rapidly transfer information between sessions in a workstation while ensuring that the operator is warned in those situations where the pasting of the clipboard information could produce errors.

The protected field comparison and notification method of the present invention is particularly valuable in avoiding errors when relatively large volumes of information are being transferred via the clipboard memory into a multiplicity of destination sessions having one or more protected fields that exhibit minor differences in text, yet require completely different source session information. For example, consider destination session 8 having within its protected field 9 the prompt "PAY TO" in contrast to the source session prompt "PURCHASER". In the practice of the present method the operator is notified of the mismatch within the protected fields and thereby would avoid the erroneous copying of the clipboard information onto the destination session as a consequence of misreading the first prompt word.

Note that the method of the present invention as schematically depicted is not limited to alphanumeric text, but includes graphic representations in the unprotected as well as the protected fields. Likewise, the invention contemplates a practice of the method in which the notification of a protected field mismatch as conveyed to the operator may be selective as to content, for example where only the mismatched portion of the whole protected field may be accentuated for operator consideration. Such precise field or partial field identification of the mismatching information is particularly useful when large blocks of information are being transferred through the clipboard media. Refinements in the control of the clipboard to insure alignment of the source information in the destination video display space is a recognized form of information manipulation, therefore well within the scope of the contemplated present method. Though pattern mismatching in a graphics environment is clearly more elaborate than in a text mode, fundamental pattern recognition technologies are fully applicable to the method of the present invention as necessary to meet the complexities of the information within the protected fields.

The method of the present invention finds particular and immediate use in emulator environments, where advance personal computers, often referred to as workstations, having multi-tasking capability are operating in multiple sessions including, e.g., a terminal emulator session. The presence of protected fields is particularly prevalent in terminal sessions that now appear on such workstations. Nevertheless, the multi-tasking capabilities of such workstation provide the ability to utilize a clipboard utility for copying emulator session information from a source session to a destination session, the latter session similarly exhibiting a protected field operating mode.

The invention recognizes the need for transferring blocks of information through a clipboard media in the context of protected and unprotected fields with relative haste. In recognition of this objective, the method defines a sequence in which operator intervention is selective, is less error prone, and is based upon manipulations performed at high speed within the information processing environment. As a consequence, contemporary clipboard techniques can readily be used in combination with classic emulators having mixed field characteristics.

Though the invention has been illustrated and described by way of a specific embodiment, the method of the invention should be understood to encompass the full scope of practices defined by the claims set forth hereinafter.

I claim:

1. A user controlled method for transferring information in an information processing system having a video display, comprising the steps of:
   selecting from a source space as may be depicted by a video display a first field of first format, information and a second field of second format information;
   selecting a destination space as may be depicted by a video display having a third field of first format information and a fourth field for second format information;
   comparing selected information from the first field of first format information in the source space to selected information from the third field of first format information in the destination space; and
   selectively transferred second field information from the source space to the fourth field in the destination space responsive to the outcome of the comparison.

2. The method recited in claim 1 further comprising the step of: notifying the user of the comparison outcome.

3. The method recited in claim 2, wherein the step of transferring second field information is responsive to the control of the user.

4. The method recited in claim 3, wherein the step of selecting from a source space comprises the selective definition of a region on a source video display.

5. The method recited in claim 4, wherein the step of selecting a destination space comprises a selective definition of a region on a destination video display.

6. The method recited in claim 5, wherein the region on the source video display includes a protected first field and an unprotected second field.

7. The method recited in claim 6, wherein the region on the destination video display includes a protected field and an unprotected field.

8. The method recited in claim 7, wherein the step of comparing relates protected first field information to protected third field information for matching.

9. The method recited in claim 8, wherein the comparison relates characters within the protected format fields.

10. A method for selectively transferring information in a computer workstation using a video display, comprising the steps of:
    defining by selection in a source region on the video display first field and first format information and second field and second format information;
    defining by selection in a destination region on the video display a third field of first format information and a destination region for selected second format information;
    comparing selected first field information in the source region to selected third field information in the destination region; and
    selectively transferring second field information to the second format destination region responsive to the outcome of the comparison.

11. The method recited in claim 10, wherein the step of defining source information to be transferred comprises a copying to clipboard storage of a protected first field and an unprotected second field.

12. The method recited in claim 11, wherein the defined destination for selected information includes a protected field and an unprotected field.

13. The process recited in claim 12, wherein the step of comparing involves a comparison of information within a source protected first field to any information within a corresponding destination protected field.

14. A user controlled system for transferring information in an information processing system having a video display, comprising:
    means for selecting from a source space as may be depicted by a video display a first field of first format information and a second field of second format information;
    means for selecting a destination space as may be depicted by a video display having a third field of first format information and a fourth field for second format information;
    means for comparing selected information from the first field of first format information in the source space to selected information from the third field of first format information in the destination space; and
    means for selectively transferring second field information from the source space to the fourth field in the destination space responsive to the outcome of the comparison.

15. The apparatus recited in claim 14, further comprising means for notifying the user of a detected mismatch.

* * * * *